(12) United States Patent
Shuck

(10) Patent No.: US 11,351,634 B2
(45) Date of Patent: Jun. 7, 2022

(54) INVERTED DIRECTED ENERGY DEPOSITION

(71) Applicant: Rolls-Royce Corporation, Indianapolis, IN (US)

(72) Inventor: Quinlan Yee Shuck, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1061 days.

(21) Appl. No.: 15/710,424

(22) Filed: Sep. 20, 2017

(65) Prior Publication Data

US 2018/0079034 A1 Mar. 22, 2018

Related U.S. Application Data

(60) Provisional application No. 62/398,253, filed on Sep. 22, 2016.

(51) Int. Cl.
*B23K 26/342* (2014.01)
*B23K 15/00* (2006.01)
(Continued)

(52) U.S. Cl.
CPC ............ *B23K 26/342* (2015.10); *B22F 12/00* (2021.01); *B23K 15/002* (2013.01);
(Continued)

(58) Field of Classification Search
CPC .. B23K 26/342; B23K 26/144; B23K 26/032; B23K 26/08; B23K 15/002; B23K 15/0086; B33Y 10/00; B33Y 30/00
(Continued)

(56) References Cited

U.S. PATENT DOCUMENTS 5,837,960 A 11/1998 Lewis et al.
6,180,049 B1 1/2001 Jang et al.
(Continued)

FOREIGN PATENT DOCUMENTS

EP 3045254 A1 7/2016

OTHER PUBLICATIONS

Response to Search Report dated Mar. 6, 2018, from counterpart European Application No. 17187191.6, filed Oct. 3, 2018, 49 pp.
(Continued)

*Primary Examiner* — Tu B Hoang
*Assistant Examiner* — Alba T Rosario-Aponte
(74) *Attorney, Agent, or Firm* — Shumaker & Sieffert, P.A.

(57) ABSTRACT

An example system may include a material source and a substrate having a molten pool on a surface of the substrate, wherein the molten pool faces a downward direction defined with respect to gravity. The system may include a computing device. An example technique may include, by the computing device, controlling the material source to direct a stream of solid material to the molten pool in an upward direction defined with respect to gravity. The material combines with the molten pool to form a deposited volume of a plurality of deposited volumes. The plurality of deposited volumes defines a component. An example computer readable storage medium may include instructions that, when executed, cause at least one processor to control, based on a digital representation of the component, an energy source to direct an energy beam at the substrate to form the molten pool, and control the material source.

7 Claims, 4 Drawing Sheets

(51) Int. Cl.
  *B23K 26/08* (2014.01)
  *B33Y 10/00* (2015.01)
  *B23K 26/03* (2006.01)
  *B33Y 30/00* (2015.01)
  *F01D 5/00* (2006.01)
  *B22F 12/00* (2021.01)
  *B23K 26/144* (2014.01)
  *B22F 5/04* (2006.01)
  *B22F 5/00* (2006.01)
  *B22F 10/10* (2021.01)

(52) U.S. Cl.
  CPC ........ *B23K 15/0086* (2013.01); *B23K 26/032* (2013.01); *B23K 26/08* (2013.01); *B23K 26/144* (2015.10); *B33Y 10/00* (2014.12); *B33Y 30/00* (2014.12); *F01D 5/005* (2013.01); *B22F 5/009* (2013.01); *B22F 5/04* (2013.01); *B22F 10/10* (2021.01); *F05D 2230/22* (2013.01)

(58) Field of Classification Search
  USPC ........................................................ 219/76.1
  See application file for complete search history.

(56) References Cited

U.S. PATENT DOCUMENTS

| | | | | |
|---|---|---|---|---|
| 6,401,001 B1 * | 6/2002 | Jang | ...................... | H01L 21/288 700/118 |
| 6,995,334 B1 * | 2/2006 | Kovacevic | ......... | B23K 35/0244 219/121.63 |
| 8,859,054 B2 * | 10/2014 | Shuck | ..................... | C23C 24/10 427/553 |
| 2012/0164349 A1 | 6/2012 | Shuck | | |

OTHER PUBLICATIONS

Search Report from counterpart European Application No. 17187191.6, dated Mar. 6, 2018, 7 pp.
Examination Report from counterpart European Application No. 17187191.6, dated Apr. 21, 2021, 6 pp.
Response to Extended Search Report dated Apr. 21, 2021, from counterpart European Application No. 17187191.6, filed Aug. 12, 2021, 57 pp.

* cited by examiner

INVERTED DIRECTED ENERGY DEPOSITION

This application claims the benefit of U.S. Provisional Application No. 62/398,253 filed Sep. 22, 2016, which is incorporated herein by reference in its entirety.

TECHNICAL FIELD

The present disclosure generally relates to technique for forming a component using directed energy deposition.

BACKGROUND

Additive manufacturing, for example, directed energy deposition techniques, may be used to fabricate a component having a predetermined three-dimensional structure, typically by depositing material layer-by-layer or volume-by-volume to form the structure, rather than by removing material from an existing component. Additive manufacturing may be advantageous in many situations, such as rapid prototyping, forming components with complex three-dimensional structures, or the like.

SUMMARY

In some examples, the disclosure describes an example technique that includes controlling, by a computing device, a material source to direct a stream of solid material to a molten pool in an upward direction defined with respect to gravity. A substrate defines a surface having the molten pool. The molten pool faces a downward direction defined with respect to gravity. The material combines with the molten pool to form a deposited volume of a plurality of deposited volumes. The plurality of deposited volumes defines a component.

In some examples, the disclosure describes an example system that includes a material source, a substrate, and a computing device. The substrate has a molten pool on a surface of the substrate. The molten pool faces a downward direction defined with respect to gravity. The computing device is configured to control the material source to direct a stream of solid material to the molten pool in an upward direction defined with respect to gravity. The material combines with the molten pool to form a deposited volume of a plurality of deposited volumes. The plurality of deposited volumes defines a component.

In some examples, the disclosure describes an example computer readable storage medium that includes instructions that, when executed, cause at least one processor to control, based on a digital representation of a component, an energy source to direct an energy beam at a substrate to form a molten pool. The molten pool faces a downward direction defined with respect to gravity. The instructions cause the at least one processor to control a material source to direct a stream of solid material to the molten pool in an upward direction defined with respect to gravity. The material combines with the molten pool to form a deposited volume of a plurality of deposited volumes. The plurality of deposited volumes defines the component.

The details of one or more examples are set forth in the accompanying drawings and the description below. Other features, objects, and advantages will be apparent from the description and drawings, and from the claims.

DETAILED DESCRIPTION

Figure 1A:
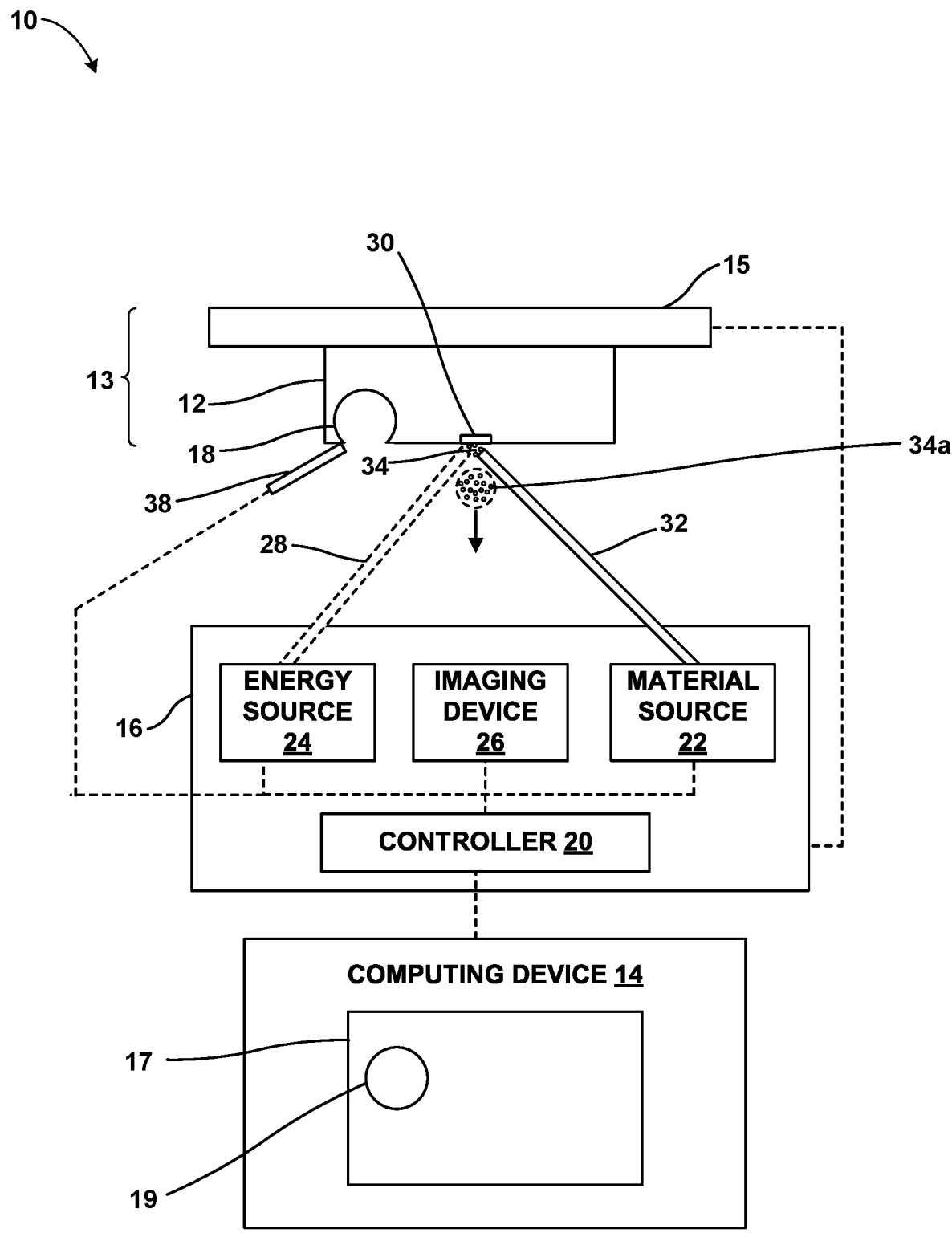
FIG. 1A is a conceptual and schematic block diagram illustrating an example system for directed energy deposition of a component.

The disclosure describes example systems and techniques for directed energy deposition for manufacturing components. Directed energy deposition systems typically deposit successive layers or volumes of material along a build direction based on a digital representation of a component. In some examples, example techniques for directed energy deposition may include directing an energy beam at a region of a component to form an advancing molten pool and delivering material to the advancing molten pool, resulting in combining of the material and a substrate of the component by sintering or melting, to form a deposited volume of a plurality of deposited volumes. The plurality of deposited volumes may define the component, for example, a volume of the component defining a chamber. During the depositing, uncombined, unmelted, or otherwise undeposited material from the stream may accumulate within depressions, chambers, or voids on or within components fabricated by additive manufacturing as successive layers are deposited. If the accumulated material is not removed, the finished article may define chambers that include residual material. Such residual material may be undesirable, for example, because they may change the mass or the mass distribution of the component, may lead to unintended vibration frequencies during operation of the component, may block channels or openings, or may result in an audible sound such as rustling or rattling.

In accordance with examples of this disclosure, to substantially avoid accumulation of such residual uncombined or otherwise undeposited material, an example system may use inverted directed energy deposition. For example, the example system may include a computing device that controls a material source to direct a stream of solid material to a molten pool in an upward direction defined with respect to gravity. The material may substantially combine with the molten pool to form a deposited volume of a plurality of deposited volumes. The plurality of deposited volumes defines a component. Undeposited material from the stream of solid material may fall away from the substrate in a downward direction defined with respect to gravity, so that the undeposited material does not accumulate within a chamber defined by the plurality of deposited volumes. Thus, in accordance with examples of this disclosure, systems and techniques are provided to fabricate components defining chambers that may be substantially free of undeposited or residual material.

A downward direction according to the disclosure may include any direction directly towards or inclined towards a gravitational force. For example, a direct downward direction may be parallel to the direction of ambient gravity. An inclined downward direction may point along an inclined axis greater than about 1 degrees, or greater than about 30 degrees, or less than about 60 degrees, or less than about 90 degrees relative to the direction of ambient gravity. An upward direction may include a direction directly away from or against the gravitational force, or inclined away from or against ambient gravity. For example, a direct upward direction may be antiparallel to the direction of ambient gravity. An inclined upward direction may point along an inclined axis greater than about 1 degrees, or greater than about 30 degrees, or less than about 60 degrees, or less than about 90 degrees relative to the direction against ambient gravity. In this way, as used here, downward and upward may be defined with respect to the direction of gravity.

FIG. 1A is a conceptual and schematic block diagram illustrating an example system 10 for directed energy deposition of a component 12. Example system 10 includes a computing device 14, a directed energy deposition tool 16, a controller 20, a material source 22, an energy source 24, and an imaging device 26.

Component 12 may include any structure which may be fabricated using directed energy deposition. For example, component 12 may include a gas turbine engine component, such as, a turbine blade, a turbine vane, a shroud, a seal fin, a platform, an airfoil, or the like. Similarly, component 12 may include structural features and geometry of any size, shape, or both. In some examples, such as some examples in which component 12 include a gas turbine engine component, component 12 may include a metal or alloy substrate. For example, component 12 may include one or more of nickel, cobalt, nickel alloys, cobalt alloys, superalloys, or their combinations. Component 12 may include single crystal or polycrystalline materials. For example, component 12 may include magnesium based, nickel based, ferrous, and titanium alloys. An example of a single crystal nickel based alloy is CMSX-4. In some examples, the alloys may include alloying additions including at least one of Mn, Mg, Cr, Si, Co, W, Ta, Al, Ti, Hf, Re, Mo, Ni, Fe, B, Nb, V, C, and Y. In some examples, component 12 may include composite materials.

In some examples, component 12 defines a depression, aperture, or void (collectively, "chamber"). In some examples, the chamber may include channels, for example, cooling channels; apertures, for example, cooling holes or impingement apertures; voids for reducing weight; apertures that may be used to join component 12 to another component, for example, by filling with a joining or brazing composition or a mechanical fastener; or other voids or regions free of material.

Computing device 14 may control system 10 for fabricating component 12. Computing device 14 may include any of a wide range of devices, including computer servers, desktop computers, notebook (i.e., laptop) computers, tablet computers, and the like. In some examples, computing device 14 may include a processor. The processor may include one or more microprocessors, digital signal processors (DSP), application specific integrated circuits (ASIC), field programmable gate arrays (FPGA), or other digital logic circuitry. Computing device 14 may be communicatively coupled to directed energy deposition tool 16 and configured to control directed energy deposition tool 16.

In some examples, computing device 14 may generate or store a component digital representation 17 of component 12. In examples in which component 12 includes chamber 18, component digital representation 17 may include a chamber digital representation 19 generally corresponding to chamber 18 of component 12. In some examples, computing device 14 may control directed energy deposition tool 16 to fabricate component 12 based on component digital representation 17.

In some examples, directed energy deposition tool 16 may include a controller 20 for controlling one or more of material source 22, energy source 24, and imaging device 26. Computing device 14 may send control signals to controller 20 for controlling direct energy deposition tool 16. For example, computing device 14 may send operational signals to and receive status signals from controller 20 to control and monitor the operation of directed energy deposition tool 16. In some examples, computing device 14 may not control directed energy deposition tool 16, and controller 20 may be configured to receive signals indicative of component digital representation 17 from computing device 14 and to control directed energy deposition tool 16 based on component digital representation 17 to fabricate component 12. Alternatively, additive manufacturing tool 16 may not include controller 20, and, instead of controller 20, computing device 14 may control one or more of material source 22, energy source 24, imaging device 26, and build platform 15 according to examples described with reference to controller 20.

In some examples, system 10 may include a build platform 15 to hold component 12. Build platform 15 may include one or more of an adhesive layer, an adhesive surface or pad, a coating, build tape, platform tape, kapton tape, blue tape, hooks, straps, brackets, or other fasteners to hold component 12 substantially stationary relative to build platform 15. In some examples, component 12 may be bonded to build platform 15 by a thin layer of fused or molten material adhering to a surface of build platform 15. In some examples, build platform 15 continues to hold partially or completely fabricated component 12 in various configurations, including upwards, downwards, sideways, or any other orientation with respect to gravity, until component 12 is detached, for example, by physical, mechanical, or chemical separation from build platform 15. In some examples, system 10 may not include build platform 15, and controller 20 may control the position and orientation of component 12, for example, by controlling an industrial robot, a movable platform, or a multi-axis stage supporting component 12.

In some examples, one or both of at least partially fabricated component 12 and part or whole of build platform 15 may be considered to form a substrate 13. In some examples, directed energy deposition tool 16 may deposit material on substrate 13 to eventually fabricate component 12, for example, held on build platform 15. In some examples, substrate 13 may include a base component on which component 12 is further formed. The base component may be formed of any material to which material may be added using directed energy deposition or material addition. In some examples, substrate 13 may include a damaged component on which component 12 is fabricated as part of a repair region, repair volume, or repair structure.

In examples in which component 12 is fabricated over a base component or a damaged component, the base or damaged component may be fabricated using any suitable technique for manufacturing metal or alloy components. For example, the base or damaged component may be fabricated using at least one of casting, molding, stamping, cutting, punching, milling, etching, welding, or other metal working techniques. In an example, the base or damaged component itself may be fabricated using directed energy deposition. Thus, example systems and techniques described herein may be used to repair damage to various gas turbine engine components, for example, by restoring damaged components so that they conform to predetermined specifications.

In some examples, controller 20 may control, based on component digital representation 17, energy source 24 to direct an energy beam 28 at substrate 13, for example, at a surface of substrate 13. Energy source 24 may include a power source such as a laser source or an electron beam source (not shown) and output the energy beam 28 directed at substrate 13. Thus, in some examples, energy beam 28 may include a laser beam, a plasma, light, electromagnetic radiation, an electron beam, or another form of focused energy absorbable by the material of component 12, the material to be added to component 12, or both, and sufficiently strong to heat the material to sinter or melt. In some examples, energy beam 28 may include both the laser beam and the electron beam.

In some examples, energy source 24 may include laser sources including a gas, solid-state, semiconductor, dye, or any other laser source that may be used for directed energy deposition. In some examples, energy source 24 may include an electron beam that includes a beam of electrons controlled by electronic and magnetic fields. In some examples, for example, where energy beam 28 includes an electron beam, system 10 may at least partially or wholly be under a reduced pressure or a vacuum. Controller 20 may control the position and orientation of energy source 24 and energy beam 28, for example, by controlling an industrial robot or a movable platform supporting energy source 24, or by controlling an optical path of energy beam 28 by controlling optical media such as reflectors, refractors, filters, and the like.

Controller 20 may control various parameters of energy source 24, including the instantaneous power, peak power or intensity, power pulsing, average beam power, a peak beam power density, a beam heat input, travel speed, wavelength, direction, and orientation. Energy beam 28 may be focused or directed by a focusing lens along or on a path. Thus, controller 20 may control energy source 24 to advance energy beam 28 along a path to form molten pool 30 on substrate 13.

Energy beam 28 may interact with material of substrate 13, for example, by fusing, melting, sintering, or otherwise modifying the material of substrate 13 at a focal region of energy beam 28 to form a molten pool 30 at a surface of substrate 13. In some examples, molten pool 30 is adjacent an existing surface of component 12. In some examples, molten pool 30 is adjacent an initial surface, for example, a pilot surface or coating applied to build platform 15. In some examples, controller 20 may control energy source 24 to emit a diffuse energy beam, or a patterned array of beams, for example, a light pattern. The focal region may change as component 12 is fabricated, for example, along regions or surfaces of partly fabricated component 12, based on component digital representation 17. In some examples, controller 20 may cause directed energy deposition tool 16 to fabricate component 12 by forming molten pools at different build locations along a tool path, and depositing material into successive molten pools to form a plurality of deposited volumes. Thus, controller 20 may ultimately deposit material in molten pools along a predetermined build direction, for example downwards (for example, directly toward or inclined toward a gravitational force).

In some examples, controller 20 may separately control material source 22 and energy source 24, for example, by separately controlling energy source 24 to direct energy beam 28 along a series of build locations to define a series of molten pools 30 or advancing molten pool 30, at successive focal regions or build locations to fabricate component 12 based on component digital representation 17, and controlling material source 22 to direct stream 32 to deposit a layer or volume of material 34 at or within molten pool 30. Therefore, controller 20 may direct a build location or molten pool 30 along a two-dimensional or three-dimensional tool path to fabricate component 12 based on component digital representation 17.

In some examples, controller 20 may control material source 22 of directed energy deposition tool 16 to direct a stream 32 of solid material 34 at molten pool 30. Controller 20 may control the position and orientation of material source 2 and stream 32, for example, by controlling an industrial robot, a movable platform, or a multi-axis stage that supports material source 20. Stream 32 may include fluid, powder, wire, particles, suspension, material suspended in a carrier fluid, or any other form of material that is susceptible to energy beam 28 to be deposited on substrate 13. For example, stream 32 may include solid material 34 in the form of ceramic or metallic powders. In some examples, material stream 32 may include solid material 34 that includes nickel, iron, or titanium alloys and optionally one or more alloying additions including one or more of Mn, Mg, Cr, Si, Co, W, Ta, Al, Ti, Hf, Re, Mo, Ni, Fe, B, Nb, V, C, and Y. In some examples, stream 32 may include solid material 34 that includes powders including one or more of polycrystalline nickel base superalloys or cobalt base superalloys, such as an alloy including NiCrAlY or CoNiCrAlY.

In some examples, solid material 34 delivered by material source 22 may include a composition substantially the same as (e.g., the same or nearly the same as) the composition of the material from which component 12 is formed. In other examples, solid material 34 delivered by material source 22 may include a composition different from the composition of the material from which component 12 is formed.

Material source 22 may include one or more delivery ports or delivery nozzles through which solid material 34 exits material source 22. Controller 20 may control material source 22 to deliver solid material 34 in stream 32 to molten pool 30. For example, material source 22 may deliver powder in conical shaped stream through a powder delivery annulus of material source 22 directed towards molten pool 30. Controller 20 may control a material flux of the stream 32, or other operating parameters of stream 32, for example, a carrier gas flow rate. In some examples, material source 22 may include a plurality of nozzles such that a powder stream having a converging profile is delivered by material source 22. For example, each nozzle of the plurality of nozzles may be substantially directed towards a target delivery zone or molten pool 30.

In some examples, solid material 34 may be combined or otherwise incorporated into molten pool 30 to define a deposited volume. For example, after combining with molten pool 30, solid material 34 and molten pool 30 may solidify or otherwise change state into a deposited volume of a plurality of deposited volumes. In some examples, controller 20 may control energy source 24 and material source 22 to deposit solid material 34 in a series of molten pools 34, based on component digital representation 17, to eventually deposit a plurality of deposited volumes that defines partly fabricated, and eventually, completely fabricated, component 12.

In some examples, controller 20 may control one or both of energy source 24 and material source 22 to define a build direction for component 12, for example, a build direction along the downward direction with respect to gravity, as shown in FIG. 1A. The build direction may be a direction in which layers of deposited volumes are deposited by directed energy deposition tool 16 during the fabrication of component 12.

Figure 1B:
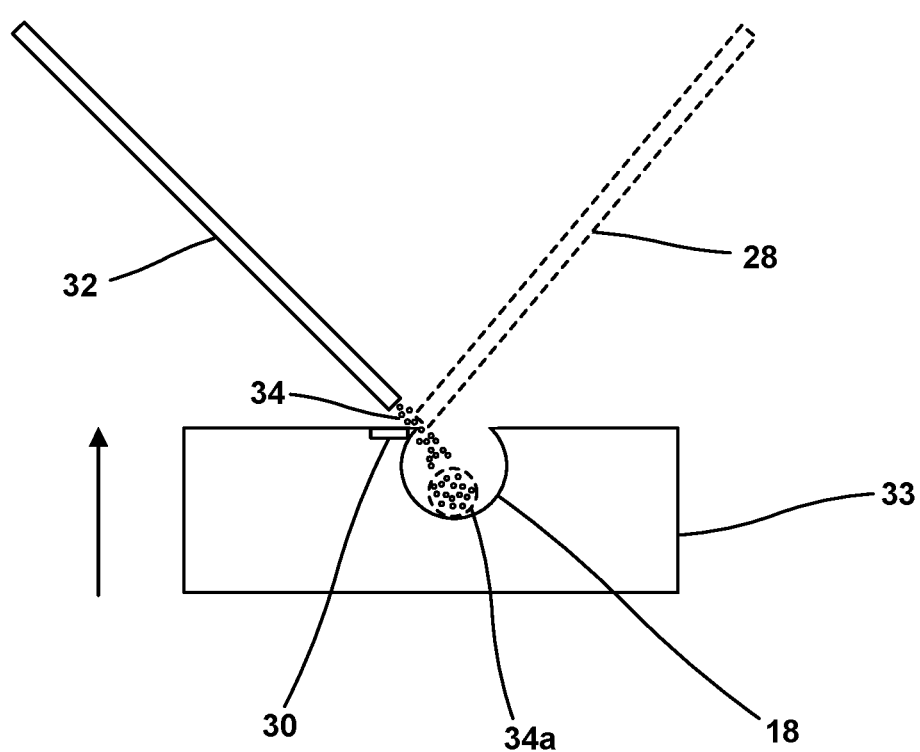
FIG. 1B is a conceptual and schematic block diagram illustrating accumulation of undeposited material in a component having a build direction along an upward direction defined with respect to gravity.

While substantially all solid material 34 from stream 32 may be combined into molten pool 30, some of solid material 34 may not combine with molten pool 30. For example, there may be slight misalignment between the path of energy beam 28 and stream 32, or local thermal variations or static electricity or other phenomena may deflect some material from stream 32 away from molten pool 30. Such undeposited material 34a may persist as residual material, for example, powder, dust, particles, agglomerates, or partly fused material, in a vicinity of molten pool 30, or otherwise on substrate 13. The presence of undeposited material 34a may be undesirable. For example, undeposited material 34a may block or otherwise prevent uniform creation of subsequent molten pools 30, leading to discontinuities or unacceptable disruptions in the structure of component 12. In some examples, component 12 may include chamber 18, and undeposited material 34a may accumulate within chamber 18. FIG. 1B is a conceptual and schematic block diagram illustrating accumulation of undeposited material 34a in a component 33 having a build direction along an upward direction defined with respect to gravity (see arrow). If solid material 34 is deposited in a downward direction (for example, in a direction directly or inclined toward gravitational forces), undeposited material 34a may accumulate on a surface of substrate 13, or eventually be incorporated within a bulk of substrate 13, or may accumulate within chamber 18, for example, as shown in FIG. 1B.

To avoid such accumulation of undeposited material 34a adjacent to molten pool 30, or on or within a surface, bulk, or chamber 18 of component 12, inverted directed energy deposition may be used, for example, as shown in FIG. 1A. In some examples, if component 13 is above directed energy deposition tool 16, for example, with stream 32 directed upwards against gravitational force towards molten pool 30 on substrate 13, undeposited material 34 may fall away from substrate 13. For example, undeposited material 34a may fall in a downward direction defined by gravitational force away from substrate 13, so that undeposited material 34a no longer accumulates at substrate 13.

In some examples, substrate 13 may be inverted so that molten pool 30 faces a downward direction defined with respect to gravity. Controller 20 may control material source 22 to direct stream 32 of solid material 34 to molten pool 30 in an upward direction defined with respect to gravity. Material, for example, solid material 34, may combine with molten pool 30, for example, by melting or fusing into molten pool 30, to form a deposited volume of a plurality of deposited volumes. The plurality of deposited volumes defines partially fabricated, and eventually, completely fabricated, component 12. For example, the plurality of deposited volumes may define a volume or region of component 12. In some examples, the plurality of deposited volumes may define a surface of chamber 18.

Figure 2A:
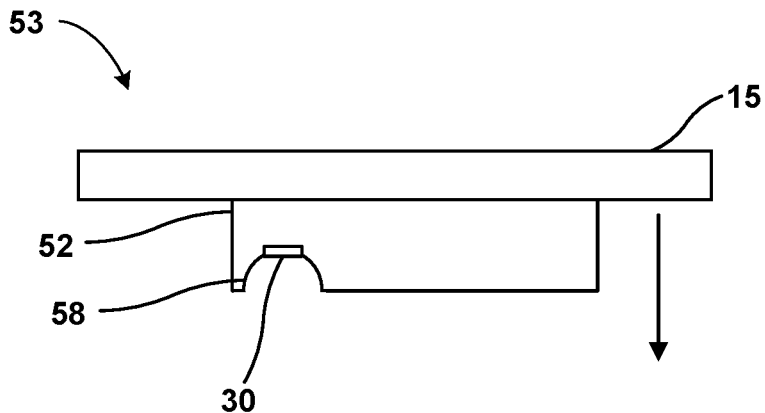
FIG. 2A is a conceptual cross-sectional diagram of an example substrate including a component defining a partially-fabricated chamber.
Figure 2B:
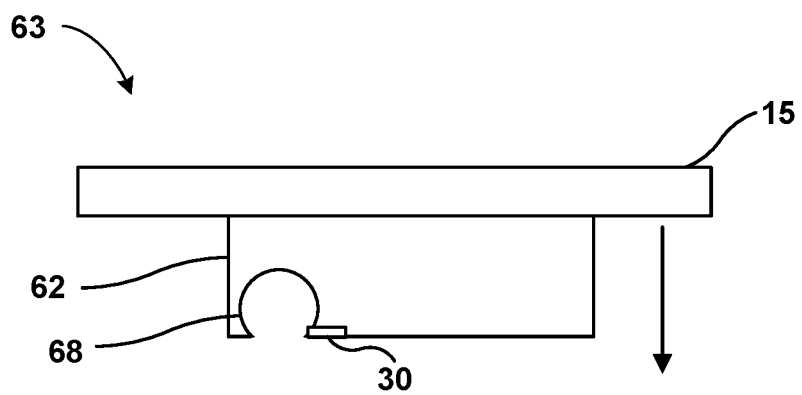
FIG. 2B is a conceptual cross-sectional diagram of an example substrate including a component defining a partially-fabricated chamber.
Figure 2C:
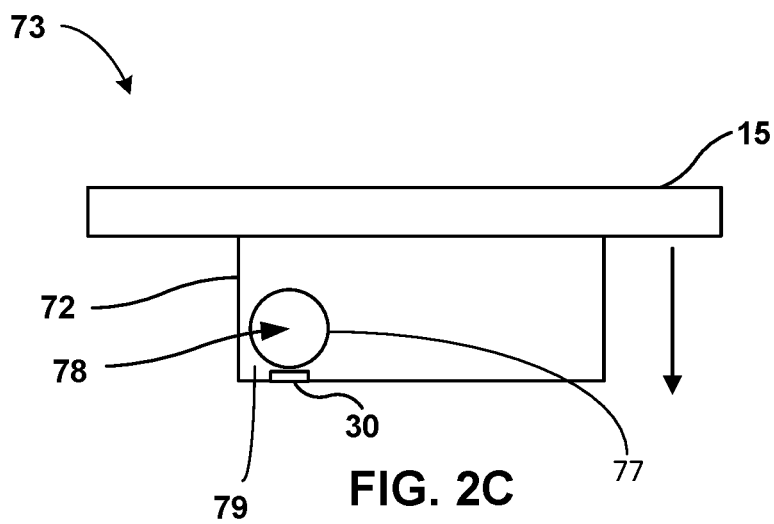
FIG. 2C is a conceptual cross-sectional diagram of an example substrate including a defining a chamber.

Thus, in some examples, controller 20 may progressively fabricate component 12 in a downward build direction such that substantially no undeposited material 34a accumulates within component 12, for example, within chamber 18, as shown in FIGS. 2A-2C. FIG. 2A is a conceptual cross-sectional diagram of an example substrate 53 including a partially fabricated component 52 defining a partially-fabricated chamber 58. Example substrate 53 includes molten pool 30 at a surface of partially-fabricated chamber 58. FIG. 2B is a conceptual cross-sectional diagram of an example substrate 63 including a component 62 defining a partially-fabricated chamber 68. Example substrate 63 includes molten pool 30 at a surface defining partially-fabricated chamber 68. FIG. 2C is a conceptual cross-sectional diagram of an example substrate 73 including a component 72, with a chamber surface 77 of the chamber wall 79 defining a chamber 78. Chamber 78 is completely defined by chamber wall 79 and substantially conforms to component digital representation 17. Chamber 78 is substantially free of undeposited material 34a. Example substrate 73 includes molten pool 30 at a surface of component 72, that is in a downward direction relative to chamber 78.

In some examples, build platform 15 may remain stationary as component 12 is fabricated. In other examples, build platform 15 may be movable or rotatable, for example, along one or more axes, and controller 20 may control the position of build platform 15. In some examples, controller 20 may successively move build platform 15 against the build direction, or to change the build location or location of molten pool 30 by changing the orientation of build platform 15, and that of component 12 or substrate 13, relative to stream 32 and energy beam 28.

In some examples, controller 20 may control imaging device 26 to image one or more of surfaces, regions, or volumes of component 12, substrate 13, build platform 15, molten pool 30, material 34, undeposited material 34a, or stream 32. Controller 20 may periodically or continuously compare the build images with component digital representation 17 to verify that component 12 substantially conforms (e.g., conforms or nearly conforms) to component digital representation 17, during fabrication through completion. In some examples, controller 20 may control one or more of material source 22, energy source 24, and build platform 15 based on the build images and component digital representation 17. For example, controller 20 may be configured to control build platform 15 and material source 22, energy source 24, and/or imaging device 26 to translate and/or rotate along at least one axis to position component 12 relative to stream 32, energy beam 28, and/or imaging device 26. Positioning component 12 relative to stream 32, energy beam 28, and/or imaging 26 may include positioning a predetermined surface (e.g., a surface to which material is to be added) of component 12 in a predetermined orientation relative to material source 22, energy source 24, and/or imaging device 26, so that material is added in regions or volumes based on component digital representation 17.

While system 10 may fabricate component 12 based on component digital representation 17 using directed energy deposition, in some examples, system 10 may also fabricate component 12 by a combination of directed energy deposition and subtractive machining of component 12 or substrate 13. For example, system 10 may optionally include machining tool 38 for one or more of milling, grinding, drilling, turning, burnishing, polishing, laser cutting, or otherwise machining component 12. In some examples, portions of component 12 may be fabricated by machining tool 38, for example, based on component digital representation 17. In some examples, controller 20 may control machining tool 38 before, during, or after directed energy deposition of one or more portions of component 12. For example, controller 20 may control directed energy deposition tool 16 to fabricate a first volume of component 12. Controller 20 may compare the first volume of component 12 to the corresponding volume of component digital representation 17, for example, using images received from imaging device 26. In response to determining that portions of component 12 formed by directed energy deposition do not substantially conform to component digital representation 17, controller 20 may then control machining tool 38 to further machine component 12 based on component digital representation 17.

While in some examples, controller 20 may control machining tool 38 to machine non-conforming portions of component 12 formed by directed energy deposition, in some examples, controller 20 may first control machining tool 38 to fabricate a first portion of component 12 using machining, and subsequently control direct energy deposition tool 16 to fabricate a second portion of component 12 on the machined first portion. For example, controller 20 may control machining tool 38 to machine a portion of component 12 to define a first chamber surface. Controller 20 may then control directed energy deposition tool 16 to subsequently form plurality of deposited volumes on the first chamber surface, to define the ultimate geometry of a chamber surface, for example, a surface of chamber 18. In some examples, controller 20 may use one or both of machining tool 38 and directed energy deposition tool 16 at different stages of fabricating component 12. In some examples, debris, dust, or machined material generated by machining of component 12 or substrate 13 by machining tool 38 may fall away from substrate 13 in a downward direction. Thus, one or both of machined material and undeposited material 34a may fall away from substrate 13 to prevent the accumulation of one or both of machine material and undeposited material 34a within component 12 or substrate 13.

In some examples, controller 20 may control build platform 15 to orient substrate 13 to allow undeposited material 34a from stream 32 to substantially fall away from substrate 13 in a direction defined with respect to gravity (for example, in the direction of the arrow in FIG. 1A). In some examples, after forming molten pool 30, and after depositing an amount of material 34 from stream 32, controller 20 may control build platform 15 to orient (or reorient) substrate 13 such that substantially all of undeposited material 34a is unencumbered by any portion of substrate 13, and is free to fall away from substrate 13. For example, substrate 13 may be orientated such that partly fabricated component 12 defining partial chamber 18 has an opening that faces downward or inclined downwards such that substantially all of undeposited material 34a within partial chamber 18 departs or falls away from chamber 18 towards gravitational forces. Thus, chamber 18 eventually will be substantially free of undeposited material 34a.

In some examples, controller 20 may control build platform 15 to move substrate 13 to cause undeposited material 34a from stream 32 to substantially fall away from substrate 13 in a direction defined with respect to gravity. For example, controller 20 may control build platform 15 to shake, vibrate, spin, rotate, or otherwise move substrate 13 to propel or otherwise force undeposited material 34a away from substrate 13, for example, in a downward direction.

In some examples, controller 20 may control directed energy deposition tool 16 or other components to cause one or more of substrate 13, energy beam 28, and stream 32 to move or reorient relative to one another. For example, controller 20 may simultaneously control build platform 15 to cause substrate 13 to move and control one or both of material source 22 and energy source 24 to respectively cause one or both of stream 32 and energy beam 28 to move or reorient relative to the substrate.

Thus, example system 10 described above may be used to fabricate a component using inverted directed energy deposition, such that the component is substantially free of undeposited material. For example, the component may define a chamber that is substantially free of undeposited material. For example, the chamber may include channels, for example, cooling channels, apertures, for example, cooling holes or impingement apertures, voids for reducing weight, apertures that may be used to join component 12 to another component, for example, by filling with a joining or brazing composition, or other voids or regions free of material. The chamber may have a predetermined cross-section, for example, a curved, a polygonal, or a piecewise curved or polygonal cross-section. System 10 may be used to fabricate components, for example, using example techniques described with reference to FIG. 3. However, system 10 may be used to implement other suitable example techniques according to the disclosure.

Figure 3:
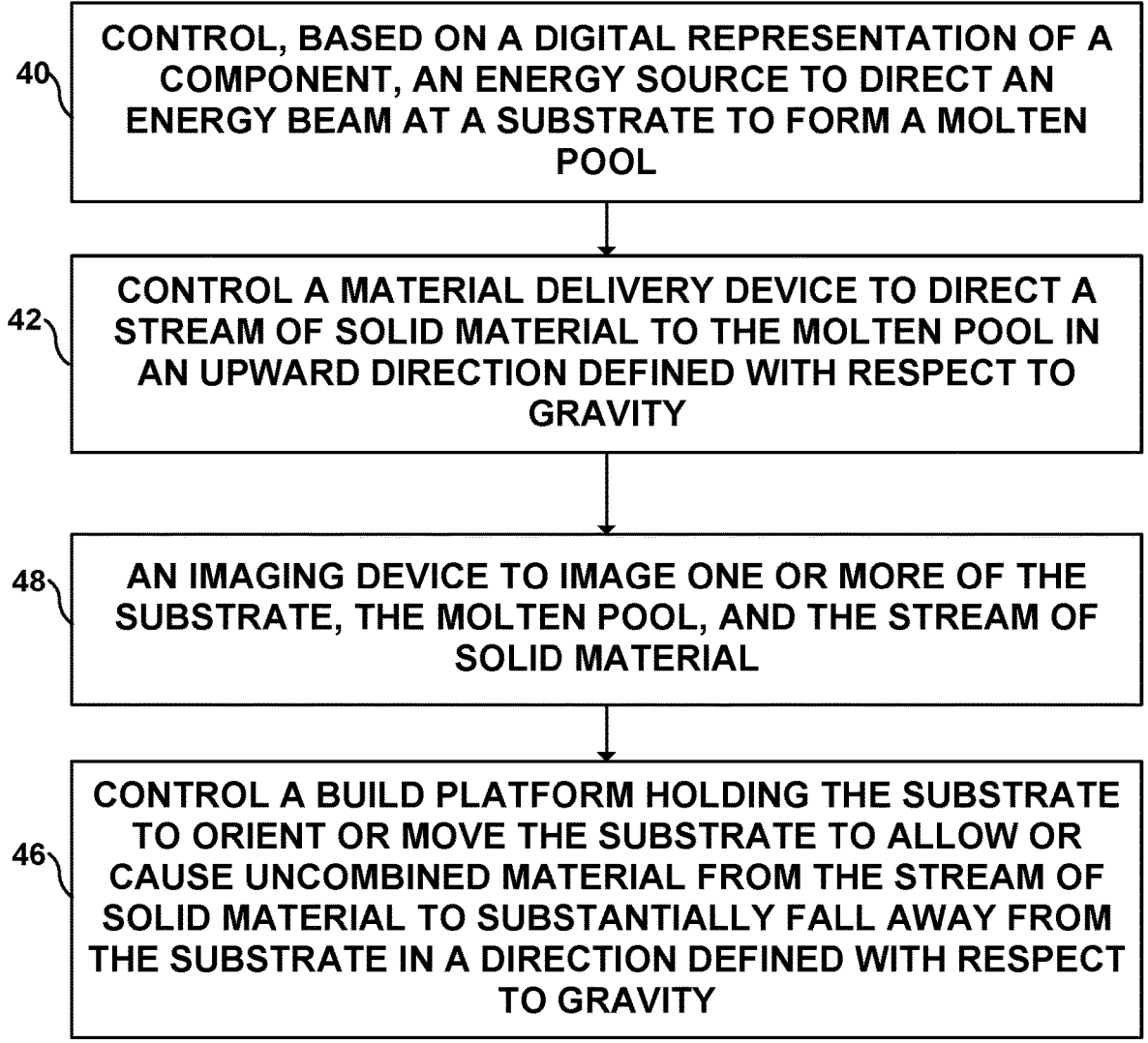
FIG. 3 is a flow diagram illustrating an example technique for directed energy deposition of a component.

FIG. 3 is a flow diagram illustrating an example technique for directed energy deposition of a component. The example technique of FIG. 3 may partly or wholly be performed by example system 10 of FIG. 1A, and is described in some examples below with reference to example system 10. However, in some examples, one or more steps of the example technique of FIG. 3 may be performed by other example systems.

The example technique of FIG. 3 may include controlling, by computing device 14, based on component digital representation 17, directed energy deposition tool 16 to direct energy source 24 to form molten pool 30 and direct material 34 to molten pool 30, to fabricate component 12.

The example technique of FIG. 3 may include, controlling, by computing device 14, based on component digital representation 17 of component 12, energy source 24 to direct energy beam 28 at substrate 13 to form molten pool 30 (40). For example, molten pool 30 may be formed before stream 32 is directed towards substrate 13. In some examples, computing device 14 may control energy source 24 to direct energy beam 28 at substrate 13 to form a series of molten pools 30, and control material source 22 to direct stream 32 to each of the series of molten pools 30. In some examples, computing device 14 may control energy source 24 to direct energy beam 28 at substrate 13 to form an advancing molten pool, for example, a molten pool having a leading edge that advances along a path, and having a trailing region along the path into which material 34 may be incorporated.

The example technique of FIG. 3 may also include controlling, by computing device 14, material source 22 to direct stream 32 of solid material 34 to molten pool 30 in an upward direction defined with respect to gravity (42). Substrate 13 defines a surface having molten pool 30. Molten pool 30 may face a downward direction defined with respect to gravity. Solid material 34 combines with molten pool 30 to form a deposited volume of a plurality of deposited volumes. The plurality of deposited volumes may define component 12. In some examples, the plurality of deposited volumes may define chamber 18.

Material source 22 may deliver solid material 34 from stream 32 that may accompany, or lag energy beam 28. In some examples, stream 32 may deliver solid material 34 simultaneously with the incidence of energy beam 28 on substrate 13. In some examples, stream 32 may deliver solid material 34 at a region after energy beam 28 has passed the region to form molten pool 30.

In some examples, computing device 14 may control energy source 24 to direct energy beam 28 to form molten pool 30 on a surface that defines chamber 18. For example, and computing device 14 may direct energy beam 28 at a series of locations, forming a series of molten pools 30 along a path that defines a three-dimensional surface of chamber 18. For example, chamber 18 may be spherical, and the path may be spiral, logarithmic, arcuate, or any other path that eventually defines a sphere.

While a spherical chamber 18 is described in some examples, chamber 18 may have any suitable geometry, including cuboid, parallelepiped, spheroid, oblate, ellipsoid, combinations thereof, or any other three dimensional closed or partially closed surface. Computing device 14 may direct energy beam 28 at a series of locations based on chamber digital representation 19, so that the series of molten pools 30 or an advancing molten pool substantially covers the surface defining chamber 18. Computing device 14 may direct material 34 from stream 32 so that it is incorporated into series of molten pools 30 or the advancing molten pool to eventually form a plurality of deposited volumes substantially covering and defining chamber 18 as component 12 is built in the downward build direction.

In some examples, the example technique of FIG. 3 may optionally include, controlling, by computing device 14, imaging device 26 to image one or more of substrate 13, molten pool 30, and stream 32 (46). For example, computing device 14 may periodically or continuously compare the build images received from imaging device 26 with component digital representation 17 to verify that component 12 substantially conforms (e.g., conforms or nearly conforms) to component digital representation 17, during fabrication through completion. In some examples, controller 20 may control one or more of material source 22, energy source 24, and build platform 15 based on the location or orientation of one or more of material source 22, energy source 24, molten pool 30, build platform 15, determined from images received from imaging device 26. For example, if the location or orientation of one or more of material source 22, energy source 24, stream 32, energy beam 28, or molten pool 30 deviate from a predetermined configuration required to substantially conform component 12 with component digital representation 17, computing device 14 may accordingly reposition the component of system 10 that has deviated from specifications, based on the images received from imaging device 26.

In some examples, the example technique of FIG. 3 may further include, controlling, by computing device 14, material source 22 and energy source 24 to define a build direction of component 12 in the downward direction. For example, computing device 14 may control material source 22 and energy source 24 so that a series of molten pools 30 or an advancing molten pool is formed along a path that eventually moves in the downward direction, and so that material 34 is incorporated into molten pool 30 to define layers or portions of component in a downward build direction. Maintaining the downward build direction may prevent accumulation of undeposited material 34a within chamber 18 or otherwise within component 12, for example, by allowing or causing undeposited material 34a to fall away from component 12 in the downward direction.

In some examples, the example technique of FIG. 3 may further include, controlling, by computing device 14, build platform 15 configured to hold substrate 13, to orient substrate 13 to allow undeposited material 34a from stream 32 to substantially fall away from substrate 13 in a direction defined with respect to gravity (48). In some examples, computing device 14 may additionally or alternatively control build platform 15 to move substrate 13 to cause undeposited material 34a to substantially fall away from substrate 13 in the direction defined with respect to gravity. In some examples, causing or allowing undeposited material 34a away from substrate 13 may cause or allow component 12 to be substantially free of undeposited material 34a. For example, chamber 18 may be substantially free of undeposited material 34a from stream 32 of solid material 34.

Thus, systems and techniques described above may be used to fabricate a component that is substantially free of undeposited material, for example, a component defining a chamber that is substantially free of undeposited material, based on a digital representation of the component.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

Various examples have been described. These and other examples are within the scope of the following claims.

The invention claimed is:
1. A method comprising:
    forming a component that includes a closed hollow chamber, wherein forming the component includes:
        controlling, by a computing device, based on a digital representation of the component, an energy source to direct an energy beam at a substrate to form a molten pool of material at a surface of the substrate and advance the molten pool along a path on the surface; and controlling, by the computing device, a material source to direct a stream of solid material to the molten pool along the path in an upward direction defined with respect to gravity, wherein the substrate defines a chamber surface having the molten pool, wherein the molten pool faces a downward direction defined with respect to gravity, wherein the material combines with the molten pool to form a deposited volume of a plurality of deposited volumes, wherein the substrate and the plurality of deposited volumes defines the component, wherein the plurality of deposited volumes defines a chamber wall, wherein the chamber surface of the chamber wall completely defines the closed hollow chamber in the component, wherein the hollow chamber is substantially free of undeposited material from the stream of solid material, wherein a plurality of layers are formed along the path of the molten pool, wherein at least a portion of the plurality of layers include a discontinuity in a respective layer, and wherein the discontinuity in the respective layer defines the hollow chamber.

2. The method of claim 1, further comprising:
controlling, by the computing device, a build platform configured to hold the substrate, to orient the substrate to allow undeposited material from the stream of solid material to substantially fall away from the substrate in a downward direction defined with respect to gravity.

3. The method of claim 2, further comprising:
controlling, by the computing device, the build platform to move the substrate to cause the undeposited material from the stream of solid material to substantially fall away from the substrate in the downward direction defined with respect to gravity.

4. The method of claim 1, further comprising:
controlling, by the computing device, the material source and the energy source to define a build direction of the component in the downward direction.

5. The method of claim 1, further comprising:
controlling, by the computing device, an imaging device to image one or more of the substrate, the molten pool, and the stream of solid material.

6. The method of claim 1,
wherein the component comprises a gas turbine engine component, and
wherein the closed hollow chamber comprises one or more cooling channels.

7. The method of claim 3, wherein the build platform is controlled to move the substrate prior to closure of the closed hollow chamber.

* * * * *